United States Patent Office 3,835,109
Patented Sept. 10, 1974

3,835,109
VINYLOXYCARBONYL GROUP AS AN AMINO PROTECTING GROUP IN THE SYNTHESES OF PEPTIDES
Roy A. Olofson and Yasushi Stephan Yamamoto, State College, Pa., assignors to Research Corporation, New York, N.Y.
No Drawing. Original application Aug. 21, 1969, Ser. No. 852,096, now Patent No. 3,711,458. Divided and this application Aug. 9, 1972, Ser. No. 279,247
Int. Cl. C07c 103/52; C07g 7/00
U.S. Cl. 260—112.5                    1 Claim

ABSTRACT OF THE DISCLOSURE

Temporary blocking, in peptide synthesis, of a free amino group by acylating same and, after peptide condensation, splitting off the acyl group introduced, wherein the free amino group is acylated with a vinyloxycarbonyl group. The vinyloxycarbonyl group may be removed from a product peptide with bromine or another halogen followed by alcohol, with a mild acid or by mercuric ion induced hydrolysis.

---

The invention described herein was developed under a grant (GM–13980) from the U.S. Public Health Service, Department of Health, Education and Welfare.

This is a divisional of application Ser. No. 852,096, filed August 21, 1969, now Pat. No. 3,711,458.

This invention relates to novel stable vinyloxycarbonyl derivatives of amino acids, peptides and amino acid and peptide derivatives all useful as reagents or intermediates in peptide syntheses and also to processes for using the same in the syntheses of peptide. In particular this invention provides methods for the temporary blocking in peptide syntheses of a free amino group by acylating it with a new protecting group—the vinyloxycarbonyl group— and after peptide condensation has been accomplished, splitting off the vinyloxycarbonyl group introduced.

One of the major problems in peptide syntheses is the efficient protection of an α-amino function in an amino acid or peptide while coupling the protected product at the carboxyl end thereof with an amino acid or peptide or derivative thereof exhibiting a free α-amino group to form an amide bond. In peptide syntheses the protection or blocking of the amino group of one of the amino acids or peptides involved in the reaction followed by subsequent removal of the blocking group after peptide condensation, is well known and is used in order to prevent undesired side reactions. Presently the α-amino function in peptide syntheses is generally protected by one of three groups:

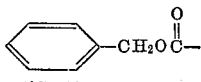

carbobenzoxy (hereinafter "Cbz")        I

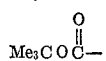

t-butoxycarbonyl (hereinafter "tBOC")        II

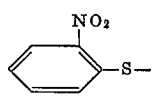

o-nitrophenylsulfenyl (hereinafter "NPS")        III

The above prior art blocking groups are all ordinarily introduced by treatment of the amino acid with an active acyl form of I, II or III (Chz chloride, tBOC azide, NPS chloride) in base. They are all usually best removed from a product peptide by treatment with an acid, either HBr or often, with II or III, the milder HCl.

However, when the performance of each of the prior art blocking groups referred to above is measured against the complexity of present synthetic objectives in peptide chemistry it is obvious there is a great need for a better blocking group—one which may be removed in higher yield and under milder conditions than these species and one which may be removed under conditions so selective that the CBz, tBOC and NPS residues are unaffected. Fulfillment of this final requirement would allow the use of these latter blocking groups for the protection of secondary functions in a synthetic scheme. The groups now used for this purpose—benzyl, tosyl, etc.—are so stable they can sometimes be detached only under conditions in which the product is itself dismembered.

Thus, it is a primary object of the instant invention to provide a new blocking or protecting group and procedures for using same in peptide syntheses, which are free from the foregoing and other such disadvantages. In this regard, it is an important object of the instant invention to provide a blocking group which may be removed in higher yield and under milder conditions than those blocking groups presently known to the art. Moreover, it is a basic object of the instant invention to provide a blocking group which may be removed under conditions which are so selective that the prior art blocking groups, Cbz, tBOC, and NPS, are unaffected thereby permitting the use of these latter groups for the protection of secondary functions.

It is another important object of this invention to provide a blocking group for the α-amino function in peptide chemistry which is extremely inexpensive, particularly when compared with prior art materials, whereby use of the new blocking group is quite economical. Additionally, the instant invention contemplates the provision of a new blocking group for peptides which may be readily added to the free amino group of an amino acid or peptide material and which may be readily removed from a product after peptide condensation.

The foregoing and other such desiderata may be realized by the use of the vinyloxycarbonyl group:

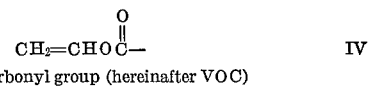

vinyloxycarbonyl group (hereinafter VOC)    IV as a temporary blocking material in peptide syntheses. VOC amino acids or peptides can be readily prepared by treatment of an amino acid or peptide with vinyl chloroformate and base.

i.e.:

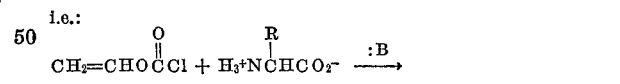

Vinyl chloroformate is a known compound readily synthesized in 40–45% yield by passing the bischloroformate of ethylene glycol through a hot tube. Details of the production of vinyl chloroformate can be found in U.S. Pat. No. 2,377,085 dated May 29, 1945 and in a paper by L. H. Lee (J. Org. Chem., 30, 3943 (1965)).

Although vinyl chloroformate is the preferred material, other sources of the VOC group may be utilized according to the instant inventive concepts. For example, other vinyl haloformates and in general species, $$CH_2=CHOCOX,$$

where X is a good leaving group may be utilized in place of vinyl chloroformate.

In addition substituted vinyloxycarbonyl groups should also be useful as temporary protecting groups in peptide syntheses according to instant inventive concepts. These can be introduced by treatment of an amino acid or peptide with a substituted vinyl haloformate or X-formate and removed in the same way as the vinyloxycarbonyl group has been removed (see below). Thus, the term "vinyloxycarbonyl group" as utilized throughout this specification and in the appended claims shall be understood to include substituted vinyloxycarbonyl groups and may be represented by the following general formula:

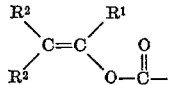

wherein $R^1$, $R^2$, and $R^3$ may be the same or different and may be H, alkyl, aryl, alkoxy, acyloxy, carboalkoxy, carboxamido, acyl, or secondary amino groups. $R^1$ and $R^2$ and $R^3$ may be joined in a ring (except that $R^1$ and $R^2$ may not be joined as a benzene or substituted benzene ring). The usual further substituents used as an aid in obtaining greater crystallinity, i.e.

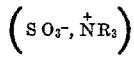

may serve as part of $R^1$, $R^2$ or $R^3$.

Several techniques are available for removal of the VOC group from a product after peptide condensation. For example, the VOC group may be split off by titration of the resultant VOC peptide with bromine in an inert solvent followed by the addition of methanol and the removal of the solvent and the $BrCH_2CH(OMe)_2$ at reduced pressure to produce the peptide hydrobromide. Alternatively the VOC group may be split off by treatment of the resultant VOC peptide with a mild acid. Moreover, the VOC group may be split off from the VOC by mercuric ion induced hydrolysis.

In order to facilitate an understanding of the instant inventive concepts, a definition of some of the terms used herein will be helpful.

The term "temporary blocking" or "temporary protection" shall be understood to mean the same as in U.S. Pat. 3,304,296 (R. Schwyzer, K. Zatsko, P. Sieber, and H. Kappeler): "that, in the synthesis of peptides, in a starting amino acid or peptide or a carboxylic acid derivative thereof, a free amino group which must not participate in the condensation reaction is protected, for instance by acylation, the thus-protected product coupled at the carboxyl end with an amino acid or peptide or derivative thereof exhibiting a free α-amino group to form an amide bond, and that from the condensation product the protecting group is removed. It is possible, of course, to use the condensation product still having the amino group protected as starting material for further condensation reactions with amino acids or peptides as are customary in the synthesis of higher peptides (being built up from a large number of amino acids) and to remove the protective group only at the end of the synthesis.

"The carboxylic acid derivatives mentioned above are those which are known to be useful in peptide syntheses for carrying out the condensation reaction. Thus, for instance, the amino acid or peptide which is to be coupled at the carboxyl end with another amino acid or peptide is used in the form of the free acid when the carbodiimide method is used for condensation, or in the form of the azide, when the azide method is used, or in the form of a carboxylic acid or carbonic acid mixed anhydride when the mixed anhydride method is used, or in the form of a reactive ester, viz a methyl or phenyl ester substituted by an electric-attracting substituent that is to say a meta-directing substituent, for instance cyanomethyl ester, carbethoxymethyl ester, or para-nitrophenyl ester. On the other hand, the amino acid or peptide which is to be coupled by means of the free group can be any carboxylic acid derivative, for instance a lower alkyl or phenyl lower alkyl, especially a benzyl, para-nitrobenzyl, para-halogenobenzyl or para-lower alkoxybenzyl ester, or an activated ester as defined above or an amide, hydrazide or anhydride. It should be noted that the kind of carboxylic acid derivative and the manner of condensation are immaterial with regard to the protection of the amino group involved here. Also, it is immaterial whether the amino acids or peptides to be condensed contain . . . further protected functional groups, for instance an acylated hydroxy group."

By the term "amino acid" in this application shall be understood to mean the so-called natural amino acids, viz. those amino acids which are formed in the hydrolysis of naturally occurring peptides and proteins, for instance glycine, alanine, valine, leucine, norleucine, cysteine, methionine, ornithine, lysine, arginine, aspartic acid, asparagine, glutamic acid, glutamine, proline, hydroxyproline, serine, threonine, histidine, tryptophane, phenylalanine, tyrosine and other α-amino acids. The amino group to be protected is the α-amino group or an amino group present in the side chain for instance the ε-amino group of lysine. The amino group to be protected is a primary amino group except in the case of proline or hydroxyproline where the α-amino group is a secondary amino group. If desired the α-amino group and any amino group of the side chain may be protected by the same protective group. As to the configuration of the amino acids defined it can be the L- or D-configuration, the configuration being irrelevant in the protection of the amino group.

The term "amino acid derivative" shall be understood to mean substances derived from amino acids which are ordinarily used as intermediates in the synthesis of peptides. These include compounds where the carboxyl groups are present as salts (such as with metal cations or amines), where carboxyl groups are masked as esters or active esters (i.e. O-methyl, O-ethyl, O-t-butyl, O-benzyl, O-pNO₂—phenyl etc.), amides, hydrazides, azides, anhydrides, or mixed anhydrides; and where other amine alcohol, sulfhydryl, or phenolic groups are protected with groups such as carbobenzoxy, carbo-t-butoxy arylsulfenyl, benzyl, tosyl, trityl, trifluoroacetyl, etc.

The term "peptide" shall be understood to mean peptide built up from amino acids as defined.

The term "peptide derivatives" shall be understood to mean peptide containing the substitutions described under amino acid derivative.

The products obtained when amino acids, peptides or protected derivatives thereof are acylated with a source of the VOC group according to this invention are valuable reagents and intermediates in the synthesis of various peptides, compounds containing peptidic fragments and proteins of known utility such as, for example in the manufacture of synthetic peptide hormones. Natural peptidic materials with important biological and pharmaceutical activity include ACTH, α- and β-MSH, gramicidin, tyrocidin, actinomycin, bradykinin, oxytocin, vasopressin, and insulin. Further synthetic analogues of some of the above including especially ACTH have been shown to have valuable pharmaceutical activity. Synthetic peptides related to ACTH are now sold commercially in Europe (and probably also soon in the U.S.) and are taking over an expanding share of the world anti-inflammatory market. Further it is generally anticipated by workers in this field that additional (though possibly yet unknown) synthetic peptides will become valuable pharmaceuticals and much effort is now being expended around the world in this area. Any procedure which allows the more economical synthesis of known (or soon to be known) peptide pharmaceuticals thus has tremendous commercial potential. It is believed that the instant invention describes such a procedure.

Production of the VOC amino acids or peptides is readily accomplished in yields averaging 40–95% by treatment of a naturally occurring amino acid or peptide with a source of the VOC residue, such as vinyl chloroformate in base using procedures related to those previously worked out for the introduction of other prior art acyl protecting groups. In a typical procedure the amino acid or peptide or protected derivative thereof is dispersed in water and cooled in an ice bath. Vinyl chloroformate in dioxane is slowly dripped into the reaction vessel with stirring and sufficient magnesium oxide is also added during this period to keep the solution basic. After the addition is completed the mixture is stirred for four hours at room temperature and then worked up by acidification with citric acid followed by extraction with ethyl acetate. In those cases where the acid itself has not yet crystallized the product may be isolated and characterized as the dicyclohexylamine (hereinafter "DCHA") salt as is commonly done with some of the tBOC-amino acids. N-ε-VOC-L-lysine is synthesized by reaction of the copper complex of lysine with vinyl chloroformate in aqueous base.

The VOC group is stable under standard peptide coupling conditions using, for example, dicyclohexylcarbodiimide (hereinafter "DCC") or N-ethyl-5-phenylisoxazolium-3'-sulfonate (hereinafter "NEPIS") as the amide bond forming reagent. VOC-L-phenylalanyl-L-leucine methyl ester is obtained, for example, in 80% yield using DCC as the coupling reagent, while VOC-L-asparaginyl-glycylglycine ethyl ester is isolated in 85% yield using the Woodward-Olofson reagent, NEPIS, as the coupling agent. In general, peptide yields from VOC amino acids are the same as those obtained for similar non-VOC peptides using the same peptide forming reagent.

VOC-L-prolylglycine acid is prepared by base hydrolysis of the ester whereby it appears that the VOC group is stable enough to base to allow hydrolytic operations at the carboxyl end of the peptide, a very useful property. VOC peptides themselves are stable for long periods of time. These compounds may, however, be induced to undergo photochemical or radical polymerization yielding some potentially interesting substances.

Removal of the protecting group after peptide condensation may be readily accomplished by several methods as mentioned previously.

For instance when VOC-diglycine ethyl ester is titrated with bromine in methylene chloride, the dibromide from this highly activated double bond instantaneously precipitates out. When methanol is added to the reaction mixture the dibromide immediately dissolved and carbon dioxide is evolved. After a few minutes the reaction mixture is evaporated to dryness leaving diglycine ethyl ester hydrobromide. In this case the reaction is so clean that the residue from the evaporation has the same melting point as the pure dipeptide ester hydrobromide prepared by classical methods. The general reactions are diagrammed below:

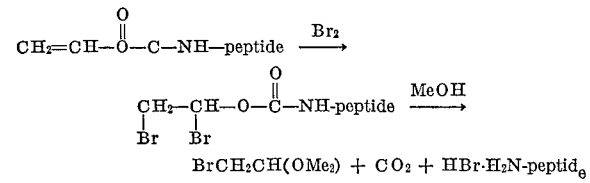

Other halogenation reagents ($Cl_2$, $I_2$, pseudohalogens) will also work in this reaction and other alcohols may be used.

In order to show that the tBOC group is stable under these conditions, N-ε-tBOC-N-α-VOC-lysine was treated with bromine and methanol and N-ε-tBOC-lysine was rapidly and cleanly obtained. Ordinarily, these reactions are carried out without direct isolation of the dibromide and can even be run with bromine in alcohol directly. Using one equivalent of $Br_2$ there is no complication with halogenation of the aromatic ring of phenylalanine.

As indicated, the VOC group may also be removed by the use of a mild acid (for example: HCl, HBr, or trifluoroacetic acid in alcohol, dioxane or other inert solvent), again in a reaction which is quite clean and qualitatively occurs under the same conditions and at about the same rate as removal of the tBOC group. The tBOC residue is the most widely used protecting group in peptide chemistry today. Since the VOC group can be removed with approximately the same yields and under the same conditions as tBOC, and since vinyl chloroformate can be made at about 5% of the cost of t-butoxycarbonyl azide it would appear that the VOC group has great potential in peptide syntheses with the acid induced hydrolysis being the most widely used method for its removal.

Additionally, as mentioned, the VOC group may be removed by mercuric ion induced hydrolysis, the use of mercuric acetate in acetic acid at 50° C. being found to deprotect VOC phenylalanine in about 10 minutes. The mercuric ion is easily removed by precipitation with hydrogen sulfide.

Finally it is anticipated that the vinyloxycarbonyl group will be split off by hydrogenolysis in the presence of appropriate heavy metal catalysts though in particular cases and with certain catalysts hydrogenation of the double bond may be an important side reaction.

The following examples are given as illustrative of the instant inventive concepts:

EXAMPLE 1

Vinyloxycarbonylglycine: Method A. Magnesium Oxide Procedure

A 50 ml. three-necked round bottom flask, charged with glycine (1.5 g., 0.02 M) in 15 ml. water, is equipped with a magnetic stirring apparatus and a dropping funnel containing vinyl chloroformate (3.2 g., 0.03 M) in 8 ml. dioxane. The flask is immersed in an ice bath and the solution stirred rapidly. Magnesium oxide powder (1.2 g., 0.03 M) is added in three portions while the chloroformate is dripped in (30 minutes). The ice bath is then removed and the solution stirred for an additional four hours at room temperature. The reaction mixture is next cooled to 0° C., acidified to Congo Red with 6N hydrochloric acid, and finally extracted with three 50 ml. portions of ethyl acetate. The combined extracts are washed with two 25 ml. portions of water, dried over anhydrous sodium sulfate and the solvent stripped off under vacuum. The solid residue, vinyloxycarbonylglycine, is recrystallized from chloroform. Yield 2.35 g., 81%. M.P. 94.5–95.5°. Anal. Calcd. for $C_5H_7NO_4$: C, 41.38%; H, 4.86%; N, 9.65%. Found: C, 41.53%; H, 4.64%; N, 9.48%.

By a similar procedure the following vinyloxycarbonyl derivatives (abbreviated VOC derivatives) can be synthesized (Table I):

TABLE I

| Compound | Crystallized from— | M.P., degree |
|---|---|---|
| VOC-L-asparagine | Ethyl acetate-pentane | 157–159 |
| VOL-L-proline | 2-butanone-petroleum ether | 93–94.5 |
| VOC-nitro-L-arginine | Dis. in ether precip. with pentane. | 1 ~66 |
| VOC-L-alanine | Obtained as oil [2] | |
| VOC-L-aspartic acid-β methyl ester. | do.[2] | |
| VOC-S-benzyl-L-cysteine | do.[2] | |
| VOC-L-glutamine | do.[2] | |
| VOC-L-glutamic acid-γ-methyl ester. | do.[2] | |
| VOC-L-leucine | do.[2] | |
| N-α-VOC-N-ε-t30C-L-lysine | do.[2] | |
| VOC-L-methionine | do.[2] | |
| VOC-L-phenylalanine | do.[2] | |
| VOC-L-serine | do.[2] | |
| VOC-L-tyrosine | do.[2] | |
| VOC-L-valine | do.[2] | |
| VOC-glycine ethyl ester | Liquid B.P. 72° at 0.2 mm | |

[1] Amorphous.
[2] See further characterization as DCHA salt in Table III in Example 4.

EXAMPLE 2

Vinyloxycarbonylglycine: Method B. pH Stat Procedure

A three-necked, 100 ml. round bottom flask is equipped with a dropping funnel, mechanical stirrer, pH electrode and a neoprene delivery tube, running from near the electrode, through an automatic titration unit to a 50 ml. burette containing ca. 6N sodium hydroxide. (Each drop of base which is added by the titrator must fall right next to the delay caused in mixing). The flask is charged with
to the delay caused inmixing). The flask is charged with
a solution of glycine (7.51 g., 0.1 M) in 20 ml. of 50%
dioxane/water and is immersed in an ice bath. The pH
stat is set at pH 9.0±0.1 and the solution is stirred vigorously as vinyl chloroformate (12.8 g., 0.12 M) in 10 ml.
dioxane is added dropwise over a 20 minute period through
the dropping funnel. The pH stat stops admitting base to
the system after another five minutes. After an additional
fifteen minutes in the ice bath, the reaction mixture is acidified to pH 4 with solid citric acid and then extracted with
six 50 ml. portions of ethyl acetate. The combined extracts are washed with water, dried over anhydrous sodium sulfate and evaporated to dryness under reduced pressure. The resulting solid is recrystallized from chloroform,
yielding 9.1 g. (75%) of vinylcarbonylglycine. M.P. 94.5–
95.0°. Second crop, 1.5 g., M.P. 94.0–95.0°.

By a similar procedure the following vinyloxycarbonyl
(VOC) derivatives can be prepared (Table II):

TABLE II

| Compound | Crystallized from— | M.P., degree |
|---|---|---|
| VOC-L-asparagine | Ethyl acetate-pentane | 157–159 |
| VOC-L-tryptophan | Ether-pentane | 67.5–70 |
| VOC-L-alanine | Obtained as oil [1] | |
| VOC-L-hydroxyproline | do.[1] | |
| VOC-L-isoleucine | do.[1] | |
| VOC-L-leucine | do.[1] | |
| VOC-L-methionine | do.[1] | |
| VOC-L-phenylalanine | do.[1] | |
| VOC-L-serine | do.[1] | |
| VOC-L-threonine | do.[1] | |
| VOC-L-valine | do.[1] | |

[1] See further characterization as DCHA salt in Table III in Example 4.

EXAMPLE 3

Vinyloxycarbonylglycine: Method C. Triethylamine Procedure

A 250 ml. three-necked round bottom flask, immersed
in an ice bath, is equipped with two dropping funnels and
a magnetic stirring bar. Into this flask is placed a solution
of glycine (3.76 g., 0.05 M) in 100 ml. of 25% dioxane/
water. The solution is rapidly stirred as vinyl chloroformate (8.0 g., 0.075 M) in 25 ml. dioxane is dripped in
through one dropping funnel while triethylamine (7.59 g.,
0.075 M) is simultaneously added through the other. The
addition rates are adjusted to keep the mixture basic at all
times. After thirty minutes, the addition is completed. The
ice bath is removed and the solution stirred for three hours
at room temperature. It is then cooled again in an ice bath,
acidified with 6N hydrochloric acid to pH 3 and the solvent evaporated under vacuum. The solid residue is extracted with 200 ml. ethyl acetate, filtered and the filtrate
washed with water and dried over anhydrous sodium sulfate. The ethyl acetate is removed *in vacuo*, and the resulting vinyloxycarbonylglycine is recrystallized from chloroform. Yield 1.5 g. or 21%.

EXAMPLE 4

Vinyloxycarbonyl-L-phenylalanine Dicyclohexylamine Salt (It is often useful to further characterize those vinyloxycarbonyl amino acids obtained as oils or amorphous
solids as crystalline salts. Since the VOC-amino acids are
easily and cleanly regenerated from salts by treatment
with acid followed by extraction into an organic solvent,
these salts are sometimes useful in the further purification
of VOC amino acids.)

Dicyclohexylamine (4.6 g., 0.25 mol) is added dropwise
to a cooled solution of vinyloxycarbonyl-L-phenylalanine
(4.7 g., 0.02 mol) in 50 ml. ether. During the addition (or
sometimes later) a white solid slowly crystallizes out. This
is filtered, washed with ether and then recrystallized from
absolute ethanol-ether. Yield: 8.1 g. (97%); M.P. 158–
159°. Anal. Calcd. for $C_{24}H_{36}N_2O_4$: C, 69.18%; H,
8.72%; N, 6.73%. Found: C, 69.37%; H, 8.36%; N,
7.06%.

TABLE III

| Dicyclohexylamine salt from— | Crystallized from— | M.P., degree |
|---|---|---|
| VOC-L-alanine | Ethanol-ether | 152.5–153 |
| VOC-L-aspartic acid-β-methyl ester. | Ethanol-ether-pentane | 141.5–143 |
| VOC-S-benzyl-L-cysteine | Methanol-ether-pentane | 143–144 |
| VOC-L-glutamine | Ethanol-ether-pentane | 147.5–149.6 |
| VOC-L-glutamic acid-γ-methyl ester. | Ethanol-ether | 155–156 |
| VOC-L-hydroxyproline | do | 179.5–181.5 |
| VOC-L-isoleucine | Methanol-ether | 180–181.5 |
| VOC-L-leucine | do | 157.5–158 |
| N-α-VOC-N-ε-tBOC-L-lysine. | Ethanol-ether | 153–154 |
| VOC-L-methionine | do | 136–138 |
| VOC-L-serine | do | [1] 218 |
| VOC-L-threonine | do | [1] 165 |
| VOC-L-tyrosine | Methanol-ether | [1] 190–195 |
| VOC-L-valine | Ethanol-ether | 158–160 |

[1] Decomposed.

EXAMPLE 5

N-ε-Vinyloxycarbonyl-L-lysine

A solution of 10.0 g. (0.055 g.) L-lysine monohydrochloride in 80 ml. water is treated with 10 g. of a 2:1
$CuCO_3/Cu(OH)_2$ mixture and boiled for 30 minutes. The
hot solution is filtered to remove the precipitated cupric
carbonate which is washed with 10 ml. hot water. The filtrate is cooled in an ice bath and 3 g. magnesium oxide is
added. This mixture is then stirred rapidly while a solution of vinyl chloroformate (8.52 g., 0.08 M) in 150 ml.
dioxane is added dropwise over a period of one hour. Stirring of the dark green mixture is continued overnight at
45° C. The solution is next cooled in an ice bath, acidified
with 50 ml. 2N acetic acid, and stirred for one hour. The
precipitated copper complex is then filtered and washed
with cold water and methanol. In order to free the N-ε-
VOC-L-lysine from the copper, the complex is suspended
in 300 ml. boiling water; acetic acid (20 ml.) is added,
immediately followed by thioacetamide (7.5 g., 0.1 M).
The solution is boiled for an additional ten minutes, while
the cupric sulfide precipitates. Norit decolorizing charcoal
is added and the hot mixture is quickly filtered on a Buchner funnel which has been covered by a mat of analytical
filter aid. The filtrate is concentrated under vacuum to a
volume of about 100 ml., cooled in the refrigerator to
crystallize the N-ε-VOC-L-lysine and filtered. The white
solid is washed with a little cold water and dried *in vacuo*
over potassium hydroxide. Yield 4.1 g., 34.5% (based on
L-lysine monohydrochloride). M.P. 2212° (dec).

EXAMPLE 6

Vinyloxycarbonyl-L-asparaginylglycylglycine Ethyl Ester

N-Ethyl - 5 - phenylisoxazolium-3′-sulfonate (2.026 g.,
8mM.) and 40 ml. acetonitrile are placed in an ice cooled
125 ml. Erlenmeyer flask and stirred with a magnetic
stirring apparatus. A solution of vinyloxycarbonyl-L-
asparagine (1.617 g., 8 mM.) and triethylamine (0.810 g,
8 mM.) in 12 ml. acetonitrile is added and stirring continued until the reaction mixture has become clear yellow
(about 45 minutes). Glycylglycine ethyl ester hydrochloride (1.558 g., 8 mM.) is then added, immediately followed by a solution of triethylamine (0.81 g., 8 mM.) in
acetonitrile. The reaction mixture is stirred overnight at
room temperature. Next the solvent is stripped off at reduced pressure and the residue triturated with hot water.
The tripeptide crystallizes upon cooling, and is recrystallized from ethanol/water. Yield 2.34 g. (85%), M.P.
186–189°. Analytical sample M.P. 190.5–192.0°.

Examples of peptides which can be prepared by similar
procedures are vinyloxycarbonylglycylglycine ethyl ester
(M.P. 115–115.5°), vinyloxycarbonyl-L-prolylglycylglycine ethyl ester (M.P. 145.5–146.5°), vinyloxycarbonyl-
L-phenylalanylglycine ethyl ester (M.P. 124–126°), and
vinyloxycarbonyl-L - asparaginyl-L-seryl-L-phenylalanyl-
L-leucine methyl ester (M.P. ~200° amorph).

EXAMPLE 7

Vinyloxycarbonyl-L-leucyl-L-leucine Methyl Ester

A mixture of vinyloxycarbonyl-L-leucine dicyclohexylammonium salt (3.83 g., 0.01 M), L-leucine methyl ester hydrochloride (1.82 g., 0.01 M) and 60 ml. chloroform are stirred while N,N'-dicyclohexylcarbodiimide (2.3 g., 0.011 M) is added. Stirring is continued for three hours. The precipitated dicyclohexylamine hydrochloride and dicyclohexylurea are filtered off and the filtrate washed with successive portions of water, dilute sulfuric acid, sodium bicarbonate and again with water; dried over anhydrous sodium sulfate, and finally evaporated to dryness in vacuo. Ethyl acetate is added to the residue and some undissolved urea filtered off. The filtrate is evaporated to give vinyloxycarbonyl-L-leucyl-l-leucine methyl ester, which is then triturated with hot methanol and crystallized in the refrigerator. Yield 1.60 g., M.P. 92–94°; second crop 0.43 g., M.P. 91.5–93° (overall 62%). Analytical sample, M.P. 93–94°. Anal. Calcd. for $C_{16}H_{26}N_2O_5$: C, 58.51%; H, 8.59%; N, 8.53%. Found: C, 58.83%; H, 8.46%; N, 8.71%.

Examples of peptides which can be synthesized by similar methods are vinyloxycarbonyl-L-alanylglycine ethyl ester (M.P. 181–183°), vinyloxycarbonyl-L-methionylglycine ethyl ester (M.P. 105–106°), vinyloxycarbonyl-L-phenylalanyl-L-leucine methyl ester (M.P. 104–105°), and vinyloxycarbonyl-L-glutamyl-(γ-methyl ester)-glycine ethyl ester (M.P. 85–86.5°).

EXAMPLE 8

Vinyloxycarbonyl-L-prolylglycine Free Acid and DCHA Salt

A 25 ml. Erlenmeyer flask containing N-ethyl-5-phenylisoxazolium-3'-sulfonate (1.012 g, 4 mM.) in 10 ml. acetonitrile is placed in an ice bath. The mixture is vigorously stirred with a magnetic stirring apparatus and a solution of vinyloxycarbonyl-L-proline (0.741 g., 4 mM.) and triethylamine (0.41 g., 4 mM.) in 6 ml. acetonitrile added. After 60 minutes 0.560 g. (4 mM.) glycine ethyl ester hydrochloride and triethylamine (0.41 g., 4 mM.) in acetonitrile are also added. The mixture is stirred overnight at room temperature, then evaporated to dryness in vacuo and the resulting residue partitioned between water and ethyl acetate. The layers are separated and the aqueous phase extracted twice with ethyl acetate. The organic layers are combined, dried over sodium sulfate, and the ethyl acetate stripped off at reduced pressure yielding an oil which is hydrolyzed in methanol/dilute aqueous sodium hydroxide. The residue obtained on removal of the solvent at reduced pressure is dissolved in dilute sodium bicarbonate solution. This is then acidified with solid citric acid and extracted with ethyl acetate. The organic phase is dried over sodium sulfate and the solvent removed at reduced pressure. The oily dipeptide acid is converted to its DCHA salt by the usual procedure; recrystallized from acetone-pentane; M.P. 161–163°.

EXAMPLE 9

Selective and Nonselective Deprotection of N-ε-t-butoxycarbonyl-N-α-vinyloxycarbonyl-L-lysine This title compound is dissolved in methylene chloride and titrated with a dilute solution of bromine in methylene chloride until the organge bromine color persists. Methanol is added and the solution allowed to stand at room temperature for an hour. All volatile material is stripped off at reduced pressure, leaving N-ε-tBOC-L-lysine hydrobromide salt as a residue. An NMR of this residue in DMSO-$d_6$ is identical with the NMR of authentic material. There are no vinyl protons present and no loss of the t-butoxycarbonyl group. It is evident that by this procedure the VOC group is selectively removed without touching the t-BOC group.

The title compound is treated with 1N HCl in dioxane for 1 hour and the volatile substances then removed in vacuo. The product after standard workup is identical with an authentic sample of L-lysine monohydrochloride. By this procedure obviously both the t-BOC and VOC groups have been split off.

EXAMPLE 10

Use of Bromine to Remove VOC Residue in Production of HBr·$H_2$NGlyGlyOEt

Vinyloxycarbonylglycylglycine ethyl ester is dissolved in methylene chloride and then titrated with a dilute solution of bromine in the same solvent until the orange bromine color persists. The dibromide precipitates as the titration proceeds. A few ml. methanol are added to the reaction mixture which is then left for an hour and finally evaporated to dryness at reduced pressure. The crystalline residue is already pure (it has the same M.P. 186–187° as an authentic pure sample of glycylglycine ethyl ester hydrobromide obtained by standard procedures). The yield is quantitative and the m.p. does not change on recrystallization.

EXAMPLE 11

Use of Bromine to Remove VOC Residue in Production of HBr$_2$·$H_2$N-L-Phe-L-LeuOMe Vinyloxycarbonyl-L-phenylalanyl - L - leucine methyl ester (2 mM.) is dissolved in 10 ml. methylene chloride then treated with 2 mM. of bromine in the same solvent. Methanol (5 ml.) is added to the reaction mixture which is then left at room temperature for two hours and finally evaporated to dryness at high vacuum. The product is dissolved in acetone and the HBr salt precipitated by the slow addition of ether; 0.702 g. (94%). The dipeptide ester hydrobromide is recrystallized from acetone-ether; M.P. 141–142.5°.

L-Alanylglycine ethyl ester hydrobromide (M.P. 144–146°) and L-phenylalanylglycine ethyl ester hydrobromide (M.P. 136–137.5°) are similarly prepared by deprotection of the vinyloxycarbonyl derivative precursors. Sometimes addition of a trace of HBr in ether aids in the crystallization purification process.

EXAMPLE 12

Use of Mild Acid to Remove VOC Residue in Production of HCl·$H_2$N-L-Ala-GlyOEt Vinyloxycarbonyl-L-alanylglycine ethyl ester (1.0 mM.) is dissolved in 2 ml. absolute ethanol and 2 ml. of a one molar solution of hydrogen chloride in ethanol added. The reaction mixture is allowed to stand at room temperature for one hour and then the volatile substances are stripped off in vacuo. The residue is triturated with ether yielding essentially pure dipeptide ester hydrochloride (~99%) which crystallizes during the trituration process; M.P. 153–155°. Recrystallization from ethanol/ether raises the melting point to 155–156°.

The same product is obtained in high yield when the reaction is run in dioxane. Glycylglycine ethyl ester hydrochloride (M.P. 185–186°) and L-asparaginylglycylglycine ethyl ester hydrochloride (hygroscopic solid) are obtained by closely related procedures from the respective vinyloxycarbonyl derivatives.

EXAMPLE 13

Use of Mild Acid to Remove VOC Residue in Production of HBr·$H_2$N-L-Phe-L-LeuOMe Vinyloxycarbonyl-L-phenylalanyl - L - leucine methyl ester (1.0 mM.) is dissolved in 2 ml. anhydrous methanol and 2 ml. of a one molar solution of HCl in anhydrous methanol is added. The reaction mixture is allowed to stand at room temperature for 2 hours and then is evaporated at reduced pressure. The product HCl·$H_2$N-L-Phe-L-LeuOMe is an amorphous solid. It is converted to the HBr salt by dissolution in water, passing through an anion exchanger (Amberlite IRA-400) in the bromide form, and evaporation of the water. The residue is recrystallized from acetone-ether; M.P. 141–142°.

The same dipeptide ester hydrobromide can be prepared directly in essentially quantitative yield by treatment of vinyloxycarbonyl-L-phenylalanyl-L-leucine methyl ester (1.0 mM.) with 3 ml. of 1.0 molar HBr in acetic acid for ten minutes. The solvent is stripped off and the product recrystallized as above; M.P. 141.5–142°.

EXAMPLE 14

Mercuric Ion Induced Deprotection of Vinyloxycarbonyl-L-phenylalanine

Vinyloxycarbonyl-L-phenylalanine (1.0 g., 4.25 mM.) is dissolved in acetic acid and mercuric acetate (1.4 g., 4.4 mM.) added. The mixture is heated to 50° for 10 minutes and then most of the acetic acid is removed at reduced pressure. The residue is dissolved in 50 ml. water and to remove the mercuric ion, hydrogen sulfide is bubbled through the solution and the precipitated mercuric sulfide filtered off. The solution is taken to dryness and the residue recrystallized from water whose pH is manipulated to obtain maximum precipitation at the isoelectric point; yield 0.4 g., 57%; M.P. ~265° (dec.). The filtrate after isolation of this first crop contains by NMR analysis an additional 35% L-phenylalanine.

The same reaction occurs when the source of mercuric ion is mercuric chloride or mercuric nitrate.

The VOC group can be removed after an initial peptide condensation or the protected peptide product can be used in further condensation procedures prior to removal of the VOC group.

From the above it will be seen that the use of the VOC protecting group provides for the temporary blocking of a free amino group during peptide condensation, with the blocking group being readily removed in high yields and under mild conditions and also under extremely selective conditions. Accordingly,

What is claimed is:

1. A member selected from the group consisting of amino acids, protected amino acids, di-, tri- and tetra-peptides built up from amino acids, and protected di-, tri- and tetra-peptides built up from amino acids wherein one or more free amino groups are substituted with a vinyloxycarbonyl group.

References Cited

Stevens et al., J. Am. Chem. Soc., 72, 725 (1950).

LEWIS GOTTS, Primary Examiner

R. J. SUYAT, Assistant Examiner

U.S. Cl. X.R.

260—482 R, 518 R